United States Patent [19]

Bulicz

[11] Patent Number: 4,917,546
[45] Date of Patent: Apr. 17, 1990

[54] SOLIDS FLUIDIZER-INJECTOR
[75] Inventor: Tytus R. Bulicz, Hickory Hills, Ill.
[73] Assignee: Institute of Gas Technology, Chicago, Ill.
[21] Appl. No.: 844,118
[22] Filed: Mar. 26, 1986
[51] Int. Cl.$^4$ ............................................. F04B 1/08
[52] U.S. Cl. .................................. 406/123; 406/135; 366/304
[58] Field of Search ............... 406/123, 135; 366/176, 366/303, 304, 306; 123/23; 222/408.5

[56] References Cited
U.S. PATENT DOCUMENTS

| | | | |
|---|---|---|---|
| 2,637,599 | 5/1953 | Fitzpatrick | 123/23 X |
| 3,161,442 | 12/1964 | Reed | 406/135 X |
| 4,361,414 | 11/1982 | Nemes et al. | 366/304 X |

FOREIGN PATENT DOCUMENTS 1313482 4/1973 United Kingdom ................ 366/304

Primary Examiner—Sherman D. Basinger
Assistant Examiner—Stephen P. Avila
Attorney, Agent, or Firm—Thomas W. Speckman

[57] ABSTRACT

An apparatus and process for fluidizing solid particles by causing rotary motion of the solid particles in a fluidizing chamber by a plurality of rotating projections extending from a rotatable cylinder end wall interacting with a plurality of fixed projections extending from an opposite fixed end wall and passing the solid particles through a radial feed orifice open to the solids fluidizing chamber on one side and a solid particle utilization device on the other side. The apparatus and process are particularly suited for obtaining intermittent feeding with continual solids supply to the fluidizing chamber. The apparatus and process are suitable for injecting solid particles, such as coal, to an internal combustion engine.

29 Claims, 1 Drawing Sheet

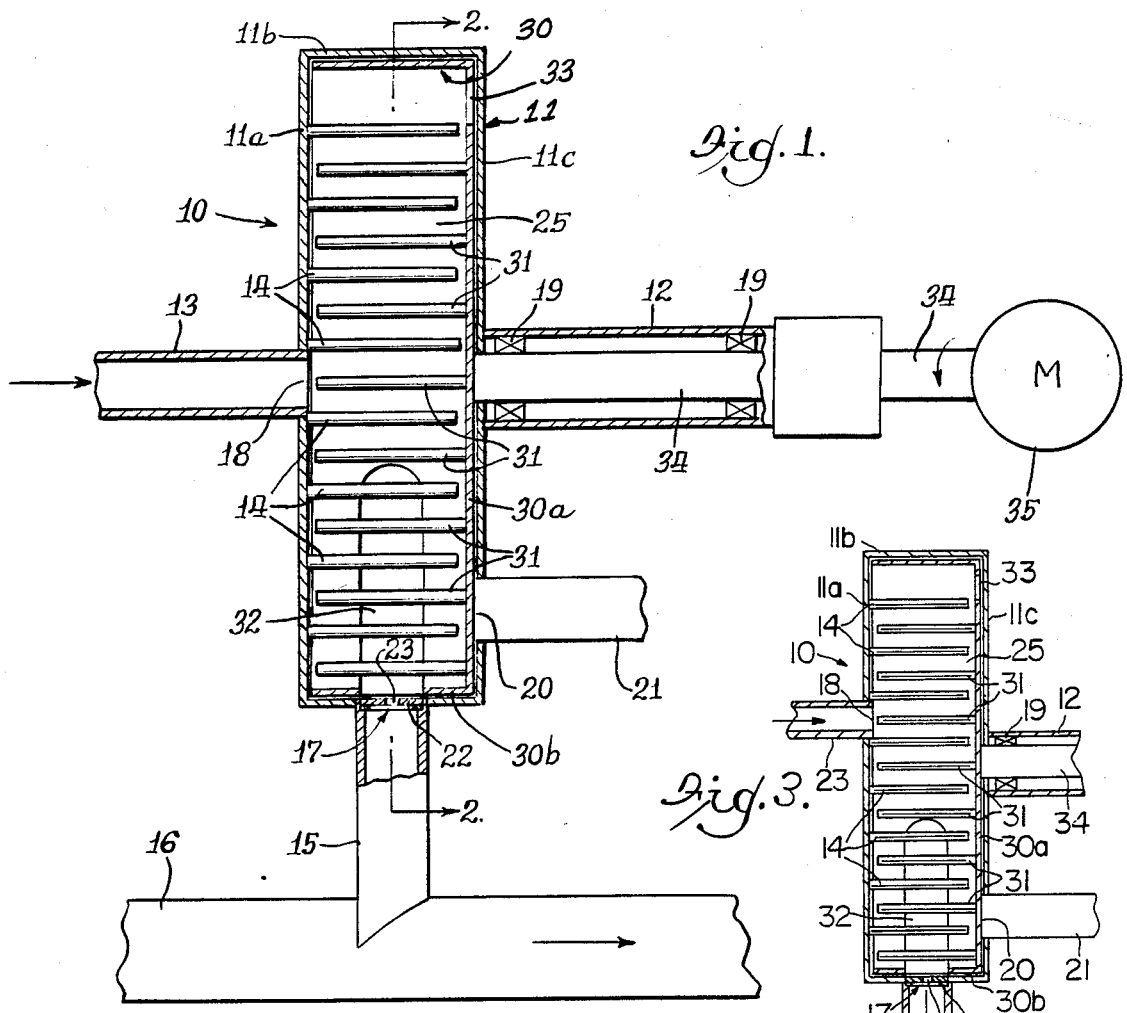
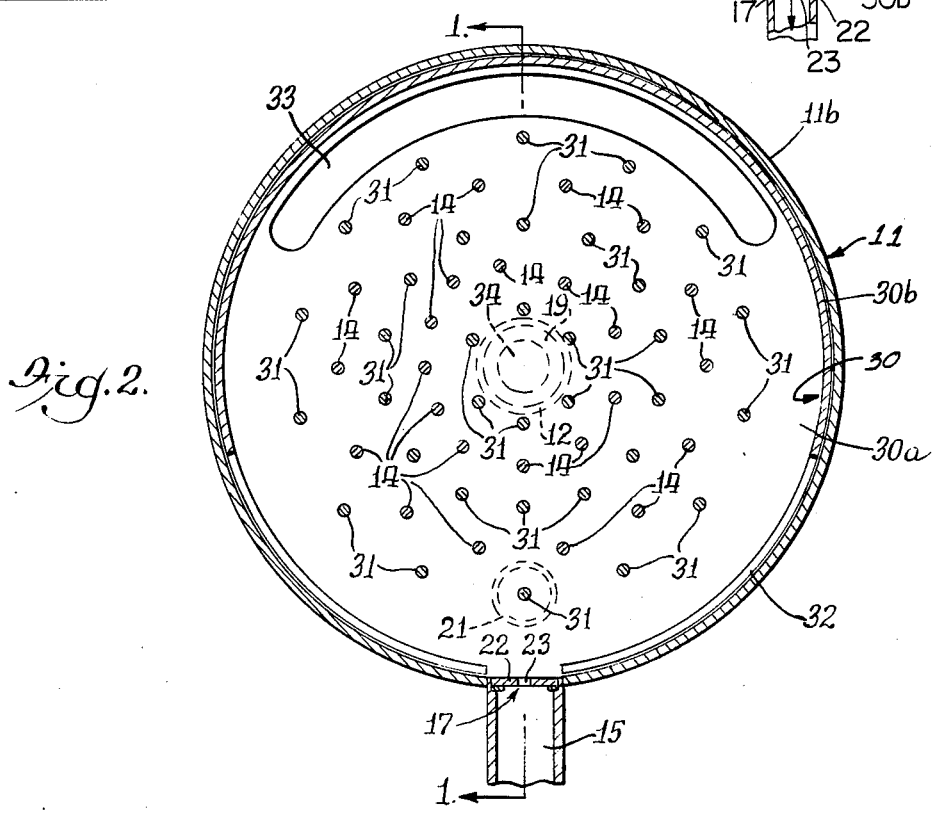
Fig. 1.
Fig. 3.
Fig. 2.

4,917,546

SOLIDS FLUIDIZER-INJECTOR

LICENSE RIGHTS

The United States Government has a paid-up license in the invention and the right in limited circumstances to require the patent owner to license others on reasonable terms as provided for by the terms of Contract No. DE-AC21-84MC21099 awarded by Department of Energy.

BACKGROUND OF THE INVENTION

1. Field of the Invention

This invention relates to an apparatus and process for fluidization of powdered solids. The apparatus and process provides intermittent feeding of controlled amounts of solids with or without a pressurized carrier gas to any further processing, such as a chemical reactor or an internal combustion engine.

2. Description of the Prior Art

Transfer of powdered solids through ducts or conduits is difficult due to rheology of the solids. Transference of powdered solids becomes even more difficult when quantitative feeding of the powder is desired to be provided in intermittent quantitized discharges. Flow of powdered solids cannot be controlled in the same manner as fluids. Densification of powdered solids, while improving the continuum quality greatly increases friction between particles which leads either to solidification of a bulk of powder or causes decrease in the powders flowability to unacceptable levels. Control of effective particle size of powdered solids is a problem, especially upon storage of micronized powders. The very small solid particles tend to agglomerate through hydroscopic or electrostatic action. Storage and handling of most fine powders causes the particles which were initially comminuted to the desired small sizes to become agglomerated with the resulting agglomerates considerably exceeding the desired size.

U.S. Pat. No. 2,265,199 teaches a vaporizing injector for injecting fuel into a combustion chamber. While this patent discusses liquid fuels, it does refer to making substantially a vapor of a powdered fuel. The vaporizer of this patent operates by centrifugal action dependent upon a rotor provided with blades which conform closely with the casing and throw the material to be vaporized against the casing walls and force it between the blades and adjacent walls to more thoroughly break up the material. The vaporizing injector is taught to be suitable for feeding a carburetor and does not provide intermittency of the feed delivery. U.S. Pat. No. 1,696,475 teaches an internal combustion engine in which volatile dust is supplied as fuel and has a rotating fuel agitator brush positoned above a fuel control gate valve to cleanly sweep the valve and screen to prevent clogging and at the same time, agitate the fuel dust to insure a continuous regular flow through the valve. U.S. Pat. No. 2,836,158 teaches a typical fuel feed system for a solid fuel burning engine wherein a feed screw is mounted in a coal feeder tube arranged to feed pulverized coal to the intake manifold. The screw has a section of fast thread to move the fuel rapidly causing the fuel particles to separate and prevent caking.

U.S. Pat. Nos. 1,510,423 and 861,362 disclose typical apparatuses for atomizing liquid fuels.

SUMMARY OF THE INVENTION

This invention relates to an apparatus and process for fluidizing powdered solids and is especially useful in providing intermittent solids feeding of controlled amounts of solids, with or without a pressurized carrier gas, to further processing of the solids.

One embodiment of the apparatus of this invention for fluidizing solid particles has a fixed casing having one end wall, an enclosing side wall, and an opposite end wall within which is mounted a rotatable cylinder having an enclosing side wall, one open end and an opposite end wall, the rotatable cylinder being rotatable within the enclosing side wall of the fixed casing. The inner side of the rotatable cylinder end wall is parallel to and spaced from the inner side of one end wall of the fixed casing which, together with the enclosing side wall of the rotatable cylinder, forms a solids fluidizing chamber. A plurality of stationary projections extend from the fixed casing end wall for a substantial portion of the length of the fluidizing chamber toward the rotatable cylinder end wall. A plurality of rotating projections extend from the rotatable cylinder end wall for a substantial portion of the length of the fluidizing chamber toward the fixed casing one end wall and are arranged with respect to the plurality of stationary projections to permit rotation of the rotatable cylinder. Rotation means are coupled to the rotatable cylinder for its rotation. A solids supply means opens to the solids fluidizing chamber for supply of solid particles to the solids fluidizing chamber and solids feed means opens to the solids fluidizing chamber for feeding the fluidized solid particles through an orifice means to a solid particle utilization means.

The process for fluidizing solid particles for feed to a solid particle utilization means according to this invention comprises supplying solid particles through one end wall of a fixed casing to a fluidizing chamber defined by the end wall of the fixed casing and the enclosing side wall and opposite end wall of a rotatable cylinder having an open end and rotatable within an enclosing side wall of the fixed casing. The rotatable cylinder is rotated causing rotary motion of the solid particles by a plurality of rotating projections extending from the rotatable cylinder end wall for a substantial portion of the length of the fluidizing chamber toward the fixed casing one end wall. The rotation also causes reduction of size of agglomerates of solid particles in the fluidizing chamber by the rotating projections coacting with stationary projections extending from the fixed casing one end wall for a substantial portion of the length of the solids fluidizing chamber toward the rotatable cylinder end wall and arranged with respect to the rotating projections to permit rotation of the rotatable cylinder. The fluidized solid particles are passed through a solids feed means open to the solids fluidizing chamber for feeding solid particles to a solid particle utilization means.

It is an object of this invention to provide an apparatus and process for fluidizing solid particles through direct imparting of kinetic momentum to the the particles.

It is another object of this invention to control the particle size of feed particles by repulverization of agglomerates formed in the storage of bulk powder.

It is yet another object of this invention to provide an apparatus and process for intermittent discharge of controlled amounts of a feed powder primarily by centrifugal forces acting on powder particles in rotary motion, with or without the assistance of a pressurized gas as an additional powder carrier.

It is still another object of this invention to provide an apparatus and process suitable for feeding pulverized coal directly to an internal combustion engine.

BRIEF DESCRIPTION OF THE DRAWING

These and other objects, advantages and features of this invention will be apparent from the description, together with the drawing in which:

FIG. 1 shows a side sectional view along line 1—1 shown in FIG. 2 of one embodiment of my invention;

FIG. 2 is an end sectional view along line 2—2 as shown in FIG. 1; and

FIG. 3 is a side sectional view along the same section as FIG. 1 showing another embodiment of my invention.

DESCRIPTION OF PREFERRED EMBODIMENTS

The apparatus and process of this invention may be used to interface between any supply of small sized solid particles and a solid particle utilization means such as an internal combustion engine, a chemical reactor, a gas-powder mixer, or any other device to receive fine powders. Suitable solid particles for use in this invention are fine or powdered particles of average particle diameters of about 1 micron to about 500 microns, and preferably about 5 microns to about 200 microns. The solid particles may be supplied to the apparatus and process of this invention by any mechanical powder conveyor, such as a screw conveyor, a pneumatic conveyor, or any other means capable of supplying small sized solid particles, preferably in a controllable and continuous fashion to the solids fluidizing chamber of this invention. Suitable means for control of the rate of solid particle supply to the fluidizing chamber of this invention are well known to the art, such as varying speeds and pitch of screw conveyors. In preferred embodiments, the apparatus and process of this invention in addition to providing fluidized solid particles to a solid particle utilization means, provides such particles at either a continuous fixed rate or in controlled intermittent quantities.

FIG. 1 is a side sectional vew of one embodiment of a solids fluidizer-injector 10 suitable for use in this invention. Fixed casing 11 is shown with one end wall 11a, enclosing side wall 11b and opposite end wall 11c. Fixed casing 11 is preferably cylindrical in cross section, as shown in FIG. 2, but may be of different cross-sectional shape away from solids radial feed opening 17. Rotatable cylinder 30 is shown having one open end and opposite end wall 30a and enclosing side wall 30b. Rotatable cylinder 30 is rotatable within enclosing side wall 11b of fixed casing 11 with the inner side of rotatable cylinder end wall 30a being parallel to and spaced from the inner side of end wall 11a of fixed casing 11 which, together with the enclosing side wall 30b of rotatable cylinder 30, forms solids fluidizing chamber 25.

A plurality of stationary projections 14 extend from fixed casing end wall 11a for a substantial portion of the length of fluidizing chamber 25 toward rotatable cylinder end wall 30a. A plurality of rotating projections 31 extend from rotatable cylinder end wall 30a for a substantial portion of the length of the fluidizing chamber 25 toward fixed casing end wall 11a and are arranged with respect to the plurality of stationary projections 14 to permit rotation of rotatable cylinder 30 without interference between the rotating projections 31 and fixed projections 14. Stationary projections 14 are preferably spaced equidistant across diameters of fixed casing end 11a, spacings between stationary projections 14 of about ¼ inch to about ¾ inch being suitable. Rotating projections 31 are spaced so as to rotate between stationary projections 14 and are preferably equidistant from the nearest stationary projections 14 upon rotation. The stationary projections 14 and the rotating projections 31 may be of any suitable shape, round of polygonal cross section projecting pins being preferred. By the terminology extending for a substantial portion of the length of the fluidizing chamber, we mean that the projection extends from the end wall a distance at least to overlap the opposing projection and preferably each projection extends for about 70 to about 95 percent of the length of the solids fluidizing chamber 25.

A rotation means, shown in FIG. 1 as motor 35, is coupled to rotating power shaft 34 which is fixed to rotatable cylinder 30 driving rotatable cylinder 30 in a rotary direction of the arrow shown at shaft 34. The rotation means and/or the coupling means may be adjustable to provide rotation of shaft 34 at the desired speed; about 100 to about 4,000 revolutions per minute being suitable. Rotating power shaft 34 may be maintained within fixed casing shaft mounting extension 12 in rotatable relation by bearings 19. Any suitable power means for providing rotation to shaft 34 may be used, such as an electric motor, a power takeoff from an internal combustion engine utilizing the fluidized solid particles as fuel, or any other suitable means of supplying rotation at the desired speed and at the desired particle feed timing in cases in which fluidized solids are provided intermittently to a solid particle utilization means.

Solids supply means, shown as solids supply conduit 13 with supply opening 18 to solids fluidizing chamber 25 provides solid particles through solids supply opening 18 to fluidizing chamber 25. Solids supply opening 18 may be in any desired location in fixed casing end 11a, as shown in FIG. 3 away from its central portion, providing direct access to solids fluidizing chamber 25, and is preferably located near the axis of rotation of rotatable cylinder 30 to provide the maximum radial movement of solid particles through the fluidizing chamber.

Solids feed means, such as rotating radial discharge opening 32 in rotatable cylinder side wall 30b, is open to solids fluidizing chamber 25 for feeding fluidized solid particles through solids radial feed opening 17 in fixed casing side wall 11b into solids radial discharge conduit 15 to solid particle utilization means feed manifold 16. Orifice plate 22 is replaceably mounted in feed opening 17. Orifice plate 22 has orifice 23 extending through it and appropriately sized to meter the desired discharge from solids fluidizing chamber 25. Suitable diameters for orifice 23 are about 50 to about 500 d and preferred diameters are about 100 to about 200 d, wherein d is the average particle diameter. During rotation of rotatable cylinder 30, when radial discharge opening 32 and radial feed opening 17 and orifice 23 are in register, there is direct opening from solids fluidizing chamber 25 to solids radial discharge conduit 15, and when the solid portion of rotatable cylinder wall 30b covers radial feed opening 17, flow of solids from chamber 25 to conduit 15 will be stopped. Rotating axial discharge opening 33 is provided in rotatable cylinder end 30a to provide overflow discharge of fluidized particles from solids fluidizing chamber 25 through solids axial discharge opening 20 into solids axial discharge conduit 21 when necessary. Thus, rotation of rotatable cylinder 30 functions as valving for these solids feed and discharge openings. The arcuate length of rotating radial discharge opening 32 and rotating axial discharge opening 33 as well as the speed of rotation of rotatable cylinder 30 and the size of orifice 23 govern the duration of and quantity of intermittent feeding of solid particles to a solid particle utilization means as will be more fully described below. Continuous feeding of fluidized solid particles may be achieved by either shortening rotating cylinder side wall 30b so that solids radial feed opening 17 is open continuously and/or extending rotating axial discharge opening 33 for 360° or reducing the diameter of rotating cylinder end 30a to provide open access from solids fluidizing chamber to solids axial discharge opening 20 in a continuous manner. In many applications of this invention where it is desired to have continuous solids supply through solids supply means 13 to solids fluidizing chamber 25 and intermittent feeding of solid particles through solids radial feed opening 17, it is preferred that rotating radial discharge opening 32 and rotating axial discharge opening 33 are located arcuately oppositely, so that intermittent feeding of solid particles to a solid particle utilization means occurs through solids radial feed opening 17 and an overflow discharge of fluidized solid particles occurs through solids axial discharge opening 20 on a radially opposed timing basis, as would be achieved with the device as illustrated in FIGS. 1 and 2. Fluidized solid particles passing through axial discharge opening 20 may be recycled to supply conduit 13. In one embodiment, providing intermittent feeding from solids fluidizing chamber 25, rotating radial discharge opening 32 and rotating axial discharge opening 33 each extend for opposed arcuate openings of about 45° to about 180°, preferably about 70° to about 120° which provides intervals of non-discharge during about 110° to about 60° of rotation between each feeding and discharge cycle.

During rotation of rotatable cylinder 30, the relative motion of rotating projections 31 with respect to stationary projections 14 generate a high kinetic agitation of the solid particles in solids fluidizing chamber 25. This improves flowability of the powdered solid particles as well as comminuting and repulverizing agglomerates of particles which may have formed in the bulk storage of solids delivered to solids fluidizing chamber 25. The particles will also be subject to a rotating motion and generate a centrifugal force resulting in a pressure upon enclosing side wall 30b of rotatable cylinder 30. Discharge of the fluidized solid particles through solids radial feed opening 17 and orifice 23 is caused both by the centrifugal force induced by rotation of rotatable cylinder 30 and any force caused by pressure differential between solids fluidizing chamber 25 and the solid particle utilization means. The system can be operated under atmospheric pressure on both sides, that is, at the solids supply opening 18 and in solids radial discharge conduit 15 with feeding being due to the centrifugal force. Feeding may also be effected by a static pressure difference across solids radial feed opening 17 and orifice 23 caused by pressurization of solids fluidizing chamber 25 or by reduced pressure of the solid particle utilization means fed through solids radial feed opening 17 and orifice 23. Reduced pressure at the outlet of orifice 23 is typical when this invention is used as a pulverized coal fumigator connected to the suction manifold of a naturally aspirated internal combustion engine.

When in operation, the system of this invention will tend to reach an equilibrium between input and output flows. For low values of a static pressure drop across rotating radial discharge opening 32, the flow rate of fluidized solid particles through rotating radial discharge opening 32 is a function of the amount of powder mass accumulated inside solids fluidizing chamber 25. An increase in supply of solid particles to solids fluidizing chamber 25 will cause an increase in the mass of solid particles within solids fluidizing chamber 25 and, therefore, an increase in the dynamic centrifugal pressure which results in an increase of the intermittent flow output until it reaches a steady-state matching the input flow. Intermittent feeding of solid particle utilization means may be obtained from a continuous input to the system of this invention and may be readily controlled by the solid particle supply rate to solids fluidizing chamber and/or arcuate extent of rotating radial discharge opening 32 and/or speed of rotation of rotatable cylinder 30. In many instances, timing of the opening of rotating radial discharge opening 32 with the functioning of a solid particle utilization means, such as an internal combustion engine, is important and may be achieved by known means of electronic timing or rotatable end open cylinder 30 and its rotating power shaft 34 may be connected to the solid particle utilization means directly or through a timing and synchronization means to provide the desired feeding synchronization. The duration of fluidized solids feeding from the device of this invention may be readily matched to the duration of the intake stroke of an internal combustion engine. The high pressure version of this invention can be used for direct injection of pulverized coal into the combustion chamber of an internal combustion engine. It is preferred that the system of this invention be sized to provide feeding rates closely corresponding to required solid particle utilization means utilization rates so that the major portion of the fluidized solids are delivered through rotating radial discharge opening 32 reducing need for recycling solids through rotating axial discharge opening 33.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process for fluidizing solid particles for feeding to a solid particle utilization means, comprising: supplying a feed selected from the group consisting of solid particles, agglomerates of said solid particles, and at least one of said solid particles and said agglomerates in carrier gas, said solid particles having an average particle diameter of about 1 to about 500 microns through one end wall of a fixed casing to a fluidizing chamber defined by said one end wall of said fixed casing and the enclosing side wall and opposite end wall of a rotatable cylinder having one open end and rotatable within an enclosing side wall of said fixed casing; rotating said rotatable cylinder causing rotary motion of said solid particles by a plurality of rotating projections extending from said rotatable cylinder end wall for a substantial portion of the length of said fluidizing chamber toward said fixed casing one end wall and causing reduction of size of agglomerates of said solid particles by said rotating projections coacting with stationary projections extending from said fixed casing one end wall for a substantial portion of the length of said solids fluidizing chamber toward said rotatable cylinder end wall, having spacings between said stationary projections of about 0.25 to about 0.75 inch and arranged with respect to said rotating projections to permit rotation of said rotatable cylinder; passing said solid particles through a solids feed means comprising an orifice open to said solids fluidizing chamber for feeding solid particles to a solid particle utilization means.

2. Process of claim 1 wherein said solids feed means comprises a rotating radial discharge opening in said enclosing side wall of said rotatable cylinder in register during at least a portion of rotation of said rotatable cylinder with said orifice mounted in a solids radial feed opening in said enclosing side wall of said fixed casing.

3. Process of claim 1 wherein said orifice has a diameter of about 50 to about 500 d, wherein d is the average diameter of said particles.

4. Process of claim 1 wherein said solid particles are supplied to the central portion of said fluidizing chamber.

5. Process of claim 1 wherein said stationary and said rotating projections extend for about 70 to about 95 percent of the length of said solids fluidizing chamber.

6. Process of claim 1 wherein the pressure in said fluidizing chamber and said solid particle utilization means is about equal and said feeding solid particles is primarily due to centrifugal force.

7. Process of claim 1 wherein the pressure in said solid particle utilization means is less than in said fluidizing chamber and said feeding solid particles is primarily due to static pressure difference.

8. Proces of claim 1 wherein said solid particles are passed continuously through said solids feed means.

9. A process for intermittent feeding of coal particles having average particle diameters of about 1 micron to about 100 microns to an internal combustion engine, comprising continuously feed said coal particles through the central portion of one end wall of a fixed casing to a fluidizing chamber defined by said one end wall of said fixed casing and the enclosing side wall and opposite end wall of a rotatable cylinder having one open end and rotatable within an enclosing side wall of said fixed casing; rotating said rotatable cylinder causing rotary motion of said solid particles by a plurality of rotating projections extending from said rotatable cylinder end wall for a substantial portion of the length of said fluidizing chamber toward said fixed casing one end wall and causing reduction of size of agglomerates of said solid particles by said rotating projections coacting with stationary projections extending from said fixed casing one end wall for a substantial portion of the length of said solids fluidizing chamber toward said rotatable cylinder end wall and arranged with respect to said rotating projections to permit rotation of said rotatable cylinder; intermittently feeding fluidized coal particles to said internal combustion engine through a rotating radial disharge opening in said enclosing side wall of said rotatable cylinder in register during at least a portion of rotation of said rotatable cylinder through an orifice with a solids radial feed opening in said enclosing side wall of said fixed casing and overflow coal particles are discharged through a rotating axial discharge opening located in said opposite end wall of said rotatable cylinder in register during at least a portion of rotation of said rotatable cylinder with a solids axial discharge opening located in said opposite end wall of said fixed casing, said rotating radial discharge opening and said rotating axial discharge opening each extend for opposed arcuate openings of about 45° to about 180°.

10. An apparatus for fluidizing solid particles comprising: a fixed casing having one end wall, an enclosing side wall, and an opposite end wall; a rotatable cylinder having an enclosing side wall, one open end and an opposite end wall, said rotatable cylinder being rotatable within said enclosing side wall of said fixed casing and the inner side of said rotatable cylinder end wall parallel to and spaced from the inner side of said one end wall of said fixed casing which together with said enclosing side wall of side rotatable cylinder forms a solids fluidizing chamber; a plurality of stationary projections extending from said fixed casing one end wall for a substantial portion of the length of said fluidizing chamber toward said rotatable cylinder end wall; a plurality of rotating projections extending from said rotatable cylinder end wall for a substantial portion of the length of said fluidizing chamber toward said fixed casing one end wall and arranged with respect to said plurality of stationary projections to permit rotation of said rotatable cylinder; rotation means coupled for rotation of said rotatable cylinder; a rotating axial discharge opening in said opposite end wall of said rotatable cylinder in register during at least a portion of rotation of said rotatable cylinder with a solids axial discharge opening located in said opposite end wall of said fixed casing; solids supply means open to said solids fluidizing chamber for supply of said solid particles; solids feed means open to said solids fluidizing chamber for at least a portion of said rotation for feeding solid particles to a solid particle utilization means.

11. An apparatus according to claim 10 wherein said solids feed means comprises a rotating radial discharge opening in said enclosing side wall of said rotatable cylinder in register during at least a portion of rotation of said rotatable cylinder with an orifice to a solids radial feed opening in said enclosing side wall of said fixed casing.

12. An apparatus according to claim 10 wherein said orifice has a diameter of about 50 to about 100 d, wherein d is the average diameter of said particles.

13. An apparatus according to claim 10 wherein said solids supply means comprises an opening in the central portion of said one end wall of said fixed casing fed by a continuous supply means.

14. An apparatus according to claim 10 wherein said stationary and said fixed projections extend for about 70 to about 95 percent of the length of said solids fluidizing chamber.

15. An apparatus according to claim 10 wherein said solids feed means comprises a rotating radial discharge opening in said enclosing side wall of said rotatable cylinder in register during at least a portion of rotation of said rotatable cylinder with an orifice to a solids radial feed opening in said enclosing side wall of said fixed casing and said rotating axial discharge opening is in register during at least a portion of rotation of said rotatable cylinder with a solids axial discharge opening located in said opposite end wall of said fixed casing, said rotating radial discharge opening and said rotating axial discharge opening each extend for opposed arcuate openings of about 45° to about 180°.

16. An apparatus according to claim 10 wherein said rotation means comprises adjustable rotation speed means.

17. An apparatus according to claim 15 wherein said rotating radial discharge opening and said rotating axial discharge opening each extend for opposed arcuate openings of about 70° to about 180° and said orifice has a diameter of about 50 to about 500 d, wherein d is the average diameter of said particles.

18. A process for fluidizing solid particles for feeding to a solid particle utilization means, comprising: supplying solid particles through one end wall of a fixed casing to a fluidizing chamber defined by said one end wall of said fixed casing and the enclosing side wall and opposite end wall of a rotatable cylinder having one open end and rotatable within an enclosing side wall of said fixed casing; rotating said rotatable cylinder causing rotary motion of said solid particles by a plurality of rotating projections extending from said rotatable cylinder end wall for a substantial portion of the length of said fluidizing chamber toward said fixed casing one end wall and causing reduction of size of agglomerates of said solid particles by said rotating projections coacting with stationary projections extending from said fixed casing one end wall for a substantial portion of the length of said solids fluidizing chamber toward said rotatable cylinder end wall and arranged with respect to said rotating projections to permit rotation of said rotatable cylinder; passing said solid particles through a solids feed means comprising an orifice open to said solids fluidizing chamber for at least a portion of said rotation for feeding solid particles to a solid particle utilization means; and opening a rotating axial discharge opening in said opposite end wall of said rotatable cylinder in register during at least a portion of said rotation of said rotatable cylinder with a solids axial discharge opening located in said opposite end wall of said fixed casing.

19. Process of claim 18 wherein said solids feed means comprises a rotating radial discharge opening in said enclosing side wall of said rotatable cylinder in register during at least a portion of rotation of said rotatable cylinder with said orifice mounted in a solids radial feed opening in said enclosing side wall of said fixed casing.

20. Process of claim 18 wherein said orifice has a diameter of about 50 to about 50 d, wherein d is the average diameter of said particles.

21. Process of claim 18 wherein said solid particles are supplied to the central portion of said fluidizing chamber.

22. Process of claim 18 wherein said stationary and said fixed projections extend for about 70 to about 95 percent of the length of said solids fluidizing chamber.

23. Process of claim 18 wherein said solid particles are fed to said solid particle utilization means through a rotating radial discharge opening in said enclosing side wall of said rotatable cylinder in register during at least a portion of rotation of said rotatable cylinder with a solids radial feed opening in said enclosing side wall of said fixed casing and overflow solid particles are discharged through said rotating axial discharge opening, said rotating radial discharge opening and said rotating axial discharge opening each extending for opposed arcuate openings of about 45° to about 180°.

24. Process of claim 18 wherein the pressure in said fluidizing chamber and said solid particle utilization means is about equal and said feeding solid particles is primarily due to centrifugal force.

25. Process of claim 18 wherein the pressure in said solid particle utilization means is less than in said fluidizing chamber and said feeding solid particles is primarily due to static pressure difference.

26. Process of claim 18 wherein said solid particles supplied to said fluidizing chamber have average particle diameters of about 1 micron to about 500 mircons.

27. Process of claim 18 wherein said solid particles are passed continuously through said solids feed means.

28. Process of claim 23 wherein said rotating radial discharge opening and said rotating axial discharge opening each extend for opposed arcuate openings of about 70° to about 180°.

29. Process of claim 1 wherein said solid particles are supplied to said fluidizing chamber away from its central portion.

* * * * *